United States Patent [19]

Reimann et al.

[11] Patent Number: 4,500,429
[45] Date of Patent: Feb. 19, 1985

[54] PROCESS FOR THE BIOLOGICAL PURIFICATION OF WASTE WATER

[75] Inventors: Hans Reimann; Allen Frydman; Uwe Fuchs, all of Munich, Fed. Rep. of Germany

[73] Assignee: Linde Aktiengesellschaft, Wiesbaden, Fed. Rep. of Germany

[21] Appl. No.: 572,043

[22] Filed: Jan. 19, 1984

[30] Foreign Application Priority Data

Jan. 19, 1983 [DE] Fed. Rep. of Germany ....... 3301643

[51] Int. Cl.³ .............................................. C02F 3/08
[52] U.S. Cl. .................... 210/616; 210/625; 210/630; 210/903; 210/906
[58] Field of Search ........................ 210/605, 615–618, 210/625, 630, 903, 906

[56] References Cited

U.S. PATENT DOCUMENTS

| | | | |
|---|---|---|---|
| 4,026,802 | 5/1977 | Akae ................................ | 210/617 X |
| 4,055,490 | 10/1977 | Hasegawa et al. .................. | 210/616 |
| 4,167,479 | 9/1979 | Besik ............................... | 210/617 X |
| 4,279,753 | 7/1981 | Nielson et al. ................... | 210/615 X |
| 4,415,454 | 11/1983 | Fuchs ................................. | 210/616 |

Primary Examiner—Thomas Wyse
Attorney, Agent, or Firm—Millen & White

[57] ABSTRACT

A process and apparatus are provided for the biological purification of phosphate-containing wastewater, wherein the wastewater is treated, in the presence of activated sludge at least a portion of which is fixed on a carrier material. The process is conducted in at least one aerobic, an anaerobic, and optionally an anoxic zone, to thereby discharge a substantially phosphate-free wastewater stream. In order to attain a high purifying effect with low cost expenditure, the activated sludge is carried on a movable carrier. The carrier material is conveyed from the anaerobic zone, optionally through the anoxic zone, to the aerobic zone, and simultaneously a like amount of carrier material is returned from the aerobic zone, optionally through the anoxic zone, to the anaerobic zone. In this process, the activated sludge is enriched with phosphates, and a portion of the phosphate-enriched activated sludge is separated from the discharged effluent.

17 Claims, 3 Drawing Figures

PROCESS FOR THE BIOLOGICAL PURIFICATION OF WASTE WATER

BACKGROUND OF THE INVENTION

This invention relates to a process and apparatus for the biological purification of phosphate-containing wastewater wherein the wastewater is treated in the presence of activated sludge, at least a portion of which is fixed on a carrier material, in at least one aerobic, an anaerobic, and optionally an anoxic zone or stage, and thereafter a substantially phosphate-free wastewater stream is discharged.

DAS No. 2,839,872 discloses a process wherein organic hydrocarbon compounds are degraded through the use of microorganisms fixed on a carrier material. In addition, nitrification and dentrification can be conducted, and phosphates are removed by chemical means from the wastewater. To effect the removal of phosphates from the wastewater, the biomass in this process is subjected in an alternating manner to aerobic and anaerobic conditions. In order to achieve this in relatively tightly packed reactors, the applicant in DAS No. 2,839,872 teaches utilizing a stationary carrier material as taught in West German patent application No. P 32 15 404.6, and effecting the alternation of the aerobic-/anaerobic treatment for the phosphate elimination by means of a complicated switching of cycles.

OBJECTS OF THE INVENTION

The present invention, has as an object to provide a process of the above-discussed type which is low-cost and attains a high purifying effect with respect to the removal of phosphates.

Upon further sutdy of the specification and appended claims, further objects and advantages of this invention will become apparent to those skilled in the art.

SUMMARY OF THE INVENTION

In accordance with the invention, biological purification of phosphate-containing wastewater is effected by treating the wastewater, in the presence of activated sludge, at least a portion of which is fixed on a carrier material, and optionally an anoxic zone to thereby discharge a substantially phosphate-free treated wastewater stream. Substantially means a content of less than 7 mg/l soluble phosphate-P.

The invention is characterized by having at least a portion of the activated sludge settled on an easily movable carrier material. By "movable carrier material" is meant a carrier material that can be easily transported from one zone or stage to the other either entrained in the wastewater or by conveying means without a high outlay in cost. The carrier material is conveyed from the anaerobic zone, optionally through the anoxic zone, to the aerobic zone and simultaneously a like amount of carrier material is returned from the aerobic zone, optionally through the anoxic zone, to the anaerobic zone. As a consequence, the activated sludge becomes enriched with the phosphates, and a portion of the phosphate-enriched sludge is then separated to remove the phosphates from the wastewater.

Preferably at least 20%, more preferably 20 to 80%, and most preferably 40 to 60% of the total amount activated sludge is fixed on the carrier material to ensure that sufficient activated sludge is passed from one zone to the other to effect the respective processes as the movable carrier is conveyed.

Since the biomass is affixed to the carrier material, it is conducted into the various reaction zones and, in this manner, is subjected in succession to aerobic and anaerobic conditions, and if nitrification or dentrification is carried out, also to anoxic conditions. In this regard, it is known that phosphate which is absorbed by the microorganisms in the activated sludge under aerobic conditions is again released from the cells of the microorganisms under anerobic conditions and thereby transferred into the liquid phase of the activated sludge.

It is most advantageous if the wastewater feed is conducted first into the anaerobic zone, and then the carrier material is transported, with a corresponding flow velocity of the wastewater, from the anaerobic into the aerobic zone. The minimal flow velocity of the wastewater should be such as that the medium residence time of the carrier material will be not more than 10 hours.

In this embodiment the carrier particles employed can be macroporous substance particles of low specific gravity. For instance open cell polyurethane or polyethylene or polypropylene foams may be used.

However, if the flow velocity of the wastewater is found to be inadequately low to transport the carrier particles entrained in the wastewater, the carrier material can then be transported from the anaerobic zone into the aerobic zone by means of conveying means such as a conveyor.

In order to obtain maximum phosphate elimination, it is necessary to subject the wastewater to an aerobic treatment before being discharged in the effluent. Maximum elimination means that more than 90% of the phosphate-P of the influent wastewater is removed. In this way, the phosphate released under anaerobic conditions can be substantially, completely, i.e., to a soluble phosphate-P concentration less than 1 mg/l resorbed by the microorganisms in the activated sludge, and a substantially phosphate-free water effluent, i.e., less than 1 mg/l $PO_4$-P, can be discharged.

The use of movable carrier material offers advantages in that the process of this invention can be utilized without a high expenditure in both new as well as in already existing wastewater treatment plants for phosphate elimination.

Since, as previously discussed, the carrier material does not carry all of the activated sludge, a portion of the phosphate-enriched activated sludge is also discharged together with the phosphate-free effluent. For this reason, it is advantageous to separate the activated sludge from the purified water in a post clarification stage. A portion of the thus-separated sludge can then be recycled to one of the treatment zones or stages, preferably to the anaerobic zone. The other portion of the separated sludge is wasted as surplus sludge.

According to another preferred embodiment of the process of this invention, a compressible carrier material is used and means are provided to compress the carrier material in order to separate phosphate-enriched liquid therefrom. For example soft polyurethane foam may be used for this purpose.

Furthermore, there is also the possibility of flushing the carrier material, for phosphate separation, during or after the anaerobic treatment with a liquid, for example, a partial stream of the incoming wastewater to be purified to cause the liquid to carry off the phosphates, and to precipitate the phosphates from the liquid. In this case, a portion of the thus phosphate-enriched flushing liquid can also be recycled into the flushing stage prior to phosphate precipitation.

When conducting the process of this invention, optimum temperature and pH values are set during the anaerobic phase in a conventional manner. Preferably, the carrier material loaded with phosphate-containing activated sludge is at least partially dewatered during or after the anaerobic treatment, and the phosphate is precipitated in the discharged water.

The invention also concerns an apparatus for conducting the process, with an anaerobic zone filled with carrier material and with an aerobic zone in communication with this anaerobic zone. The apparatus is characterized by providing first conveying means for the carrier material from the aerobic zone, optionally through an anoxic zone, into the anaerobic zone. Furthermore, second conveying means for the carrier material from the anaerobic zone, optionally through the anoxic zone, into the aerobic zone can also be provided. In a preferred alternative embodiment of the apparatus of this invention the anaerobic zone can be a moving bed.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION OF THE INVENTION

Figure 1:
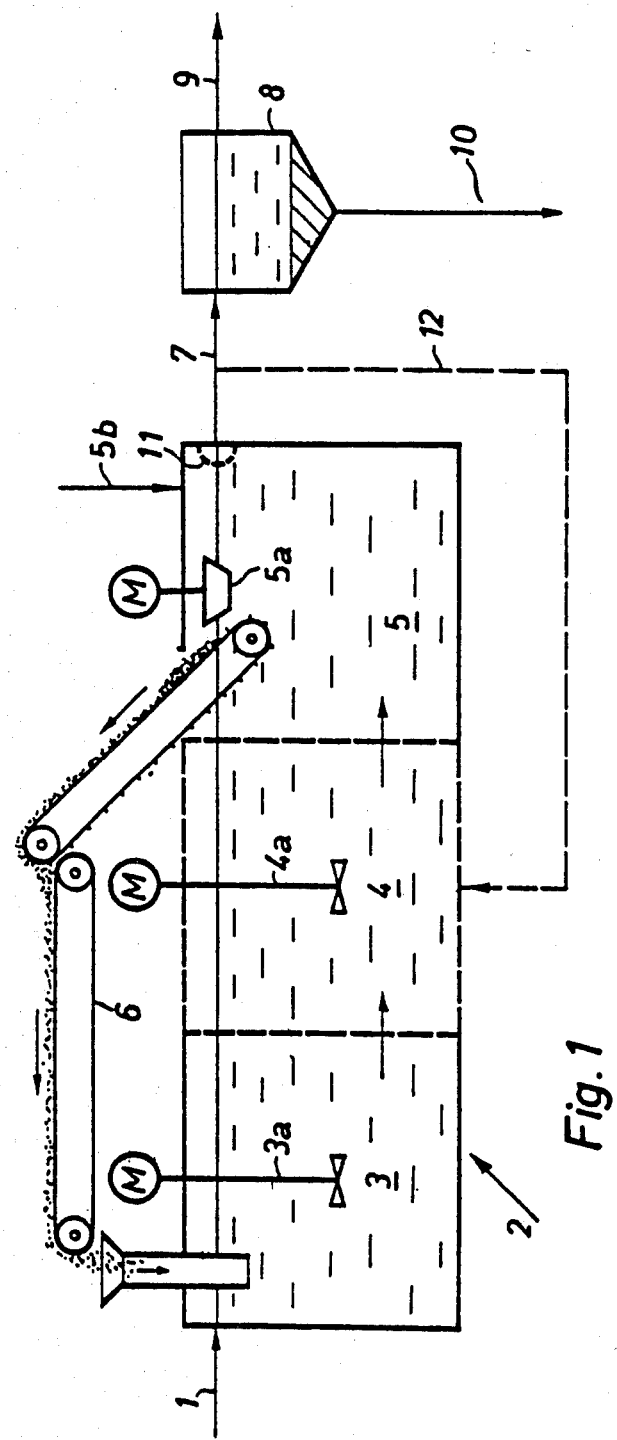
FIG. 1 is a schematic diagram of a purification/treatment plant having its various treatment zones arranged in a single basin or tank.

According to FIG. 1, phosphate-containing wastewater to be purified is supplied through an inlet 1 to a wastewater purification basin 2 made up primarily of an anaerobic zone 3, an anoxic zone 4, and an aerobic zone 5. These zones are separate sections of the single basin 2 with zones 3 and 4 being preferably sealed with respect to the atmosphere. Furthermore, the sealed zones 3 and 4 are provided respectively with mixing devices 3a and 4a, and zone 5 is equipped with an air or oxygen feed means 5b, and if desired, with a mixing device 5a. These mixing devices and air or oxygen feed means are conventional devices well known to those of ordinary skill in the art. Movable carrier material for the biomass i.e., activated sludge, is arranged in the purification basin 2. This carrier material, for example, particles of open-cell polyurethane foam or other like foam materials, is entrained, on account of its low specific gravity and small geometrical dimensions, with the flow of the wastewater from the first zone 3 into zone 5. From there, the carrier material is returned into the anaerobic zone 3 by means of a conveyor 6 which can be fashioned as a conveyor belt. The specific gravity of the carrier material is preferably no greater than 100 kg/m$^3$, more preferably 30 to 80 kg/m$^3$, and most preferably 40 to 70 kg/m$^3$. Likewise, the particles should have a size preferably no greater than 4 cm, more preferably 0.5 to 3 cm, and especially preferably 1 to 2 cm in diameter. Open cell polyurethane foam, preferably of the ether type, or polyethylene foams or polypropylene foams of open structure can be used for example.

In the anaerobic treatment zone 3, the microorganisms, which are fixed on the carrier material, release the phosphates which are incorporated into their cells in polymeric form, i.e., polyphosphates into the liquid phase and do not absorb substantially any phosphates from the wastewater. In the subsequent anoxic treatment zone 4 denitrification is effected if desired, and in the aerobic treatment zone 5, the microorganisms then absorb the phosphates contained in the wastewater and incorporate same into their cells so that a substantially phosphate-free effluent, i.e., containing less than 1 mg/l PO$_4$-P, can be withdrawn through conduit 7. Nitrification can also optionally be carried out in zone 5.

Since the entire amount of activated sludge is not fixed on the carrier material, activated sludge is discharged together with the water, i.e., 40–60% of the total biomass. In a subsequent post clarification stage 8, this activated sludge can be separated from the water, with the latter being discharged through conduit 9. The phosphate-enriched excess sludge can be discharged from the post clarification stage 8 through conduit 10. In order to prevent carrier material from being discharged with the water from the aerobic zone, the aerobic zone is equipped with a screen 11 to retain the carrier material therein.

In the embodiment of FIG. 1 all of the eliminated phosphate is contained in the discharged excess sludge.

In addition, the anoxic zone 4 is equipped with a wastewater recycle conduit 12 from the aerobic zone to provide sufficient nitrate to establish denitrification.

Microorganisms in the free and in the fixed biomass effect what is called "luxury phosphorus uptake". This means that in the aerobic stage more phosphate is picked up by the microorganisms than has been released before in the anaerobic stage thus effecting a net elimination of almost all phosphate contained in the influent wastewater. Since part of the fixed biomass during these cycles is detached from the carrier particles—in analogy to trickling filters—and thus changes into free sludge, the phosphorus contained in the biomass is discharged along with the excess sludge. Substituting the detached part of the biomass new biomass grows up effecting further "luxury uptake" in these cycles.

Figure 2:
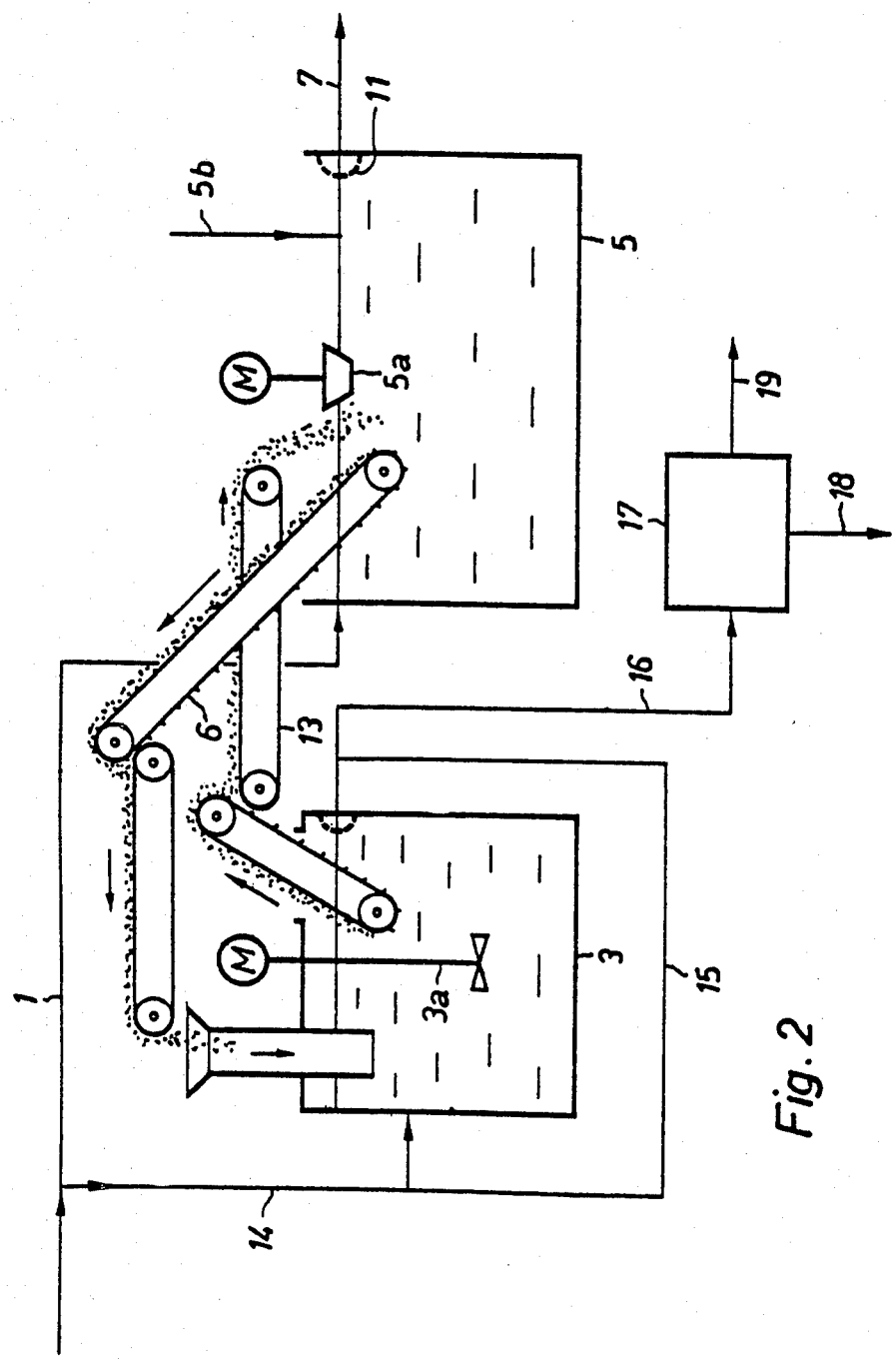
FIG. 2 is a schematic diagram of a wastewater purification treatment plant having respective separate basins making up the zones for the anaerobic and the aerobic treatment.

In another embodiment according to FIG. 2, the phosphate-containing wastewater is supplied through conduit 1 to an aerobic treatment zone 5. The microorganisms absorb phosphate from the wastewater stream to be purified while subjected to the aerobic conditions, so that a stream depleted of phosphates can be removed through conduit 7. The carrier material, at this point loaded with phosphate-containing activated sludge, is introduced into the anaerobic treatment zone 3 by means of the conveyor belt 6, while simultaneously a like amount of carrier material is conveyed by means of a conveyor belt 13 from the anaerobic zone into the aerobic zone 5. In the anaerobic zone 3, the carrier material is flushed with a liquid, for example, a partial stream of wastewater to be purified, branched off from inlet 1 through conduit 14. This partial stream is 3–20%, and more preferably 5–10% of the wastewater flow.

The flushing liquid is then discharged in part through conduit 16 and in part recycled through conduit 15. The stream discharged through conduit 16 is fed to a phosphate precipitation stage 17. A phosphate-enriched precipitated sluge is then separated and discharged through conduit 18 from the partial stream of flushing liquid. The partial stream through conduit 15 can be combined with liquid already enriched with phosphate as shown.

The phosphate precipitation is conducted in the phosphate precipitation stage 17 arranged in conduit 16 by means of appropriate conventional precipitants. A substantially phosphate-free effluent is withdrawn through conduit 19, which effluent can optionally be conducted to a preliminary clarification stage (not shown) in the system.

Figure 3:
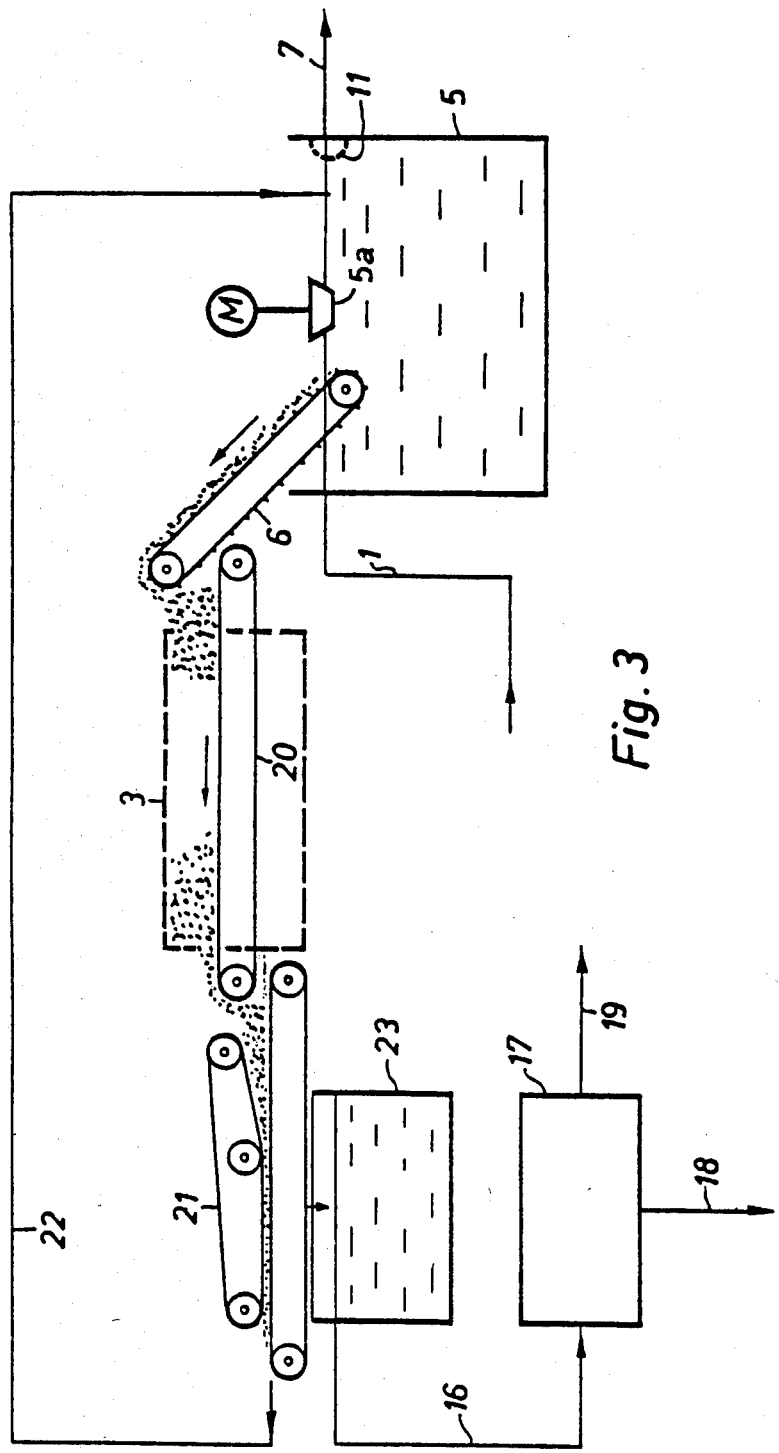
FIG. 3 is a schematic diagram of a wastewater purification plant having a basin or tank for conducting the aerobic treatment and a moving bed for conducting the anaerobic treatment.

According to FIG. 3, the anaerobic treatment zone 3 of FIG. 2 is a moving bed of small volume having conveying means 20. In comparison with basin 5 the volume of the moving bed is about 20 to 40% in volume.

The carrier material passes from the aerobic zone on a conveyor belt 6 into the anaerobic treatment stage 3, and in particular, onto the conveying means 20. During the anaerobic treatment, the microorganisms release the phosphate which is incorporated into their cells into the liquid. For this reason, the carrier material can be conveyed to a pressing unit 21, conventional in nature, which squeezes out the liquid carried in the carrier material and thus, the phosphates. Examples for such pressing units may be belt filter presses or vacuum belt filters or similar devices.

The carrier material is then returned through conduit 22 into the aerobic treatment zone 5. The pressed-out liquid is collected in a container or tank 23 and fed to a phosphate precipitation stage 17 through conduit 16 and the phosphate-free liquid discharged through conduit 19 and phosphate-containing sludge discharged through conduit 18 as in the previously discussed embodiment of FIG. 2.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

An influent of 2000 m$^3$/h of wastewater containing 20 kg/h of phosphate-P is treated according to the embodiment of FIG. 1. The stages 3, 4 and 5 have volumes of 6,000 m$^3$ each and the clarifier 8 has a volume of 8,000 m$^3$. The recycle 12 is 200% of the wastewater flow 1, the sludge recycle is 70% of the flow 1. In the excess sludge flow of about 30 m$^3$/h 18 kg/h of P is discharged, whereas in the effluent 9 the rest of 2 kg/h P is contained. Thus the effluent P concentration is 1 mg/l as a medium value.

In the embodiment of FIG. 2 the wastewater flow is the same. Basin 5, however, has a volume of 4,000 m$^3$, and basin 3 of 2,000 m$^3$. About 50% per hour of the carrier particles contained in basin 5 are conveyed to basin 3, where they are held under anaerobic conditions and are flushed with 150 m$^3$/h of a side stream wastewater. This stream is enriched with 12 kg/h of phosphate-P and flows to the precipitation unit 17 from where the phosphates are discharged as calcium phosphates. 6 kg/h of P is discharged with the excess sludge and 2 kg/h P is discharged with the effluent from the post clarifier.

Similar figures apply to the embodiment of FIG. 3 in analogy to the last example.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the biological purification of phosphate-containing wastewater wherein the wastewater is treated, in the presence of activated sludge, at least a portion of which is attached on a carrier material, and the process comprising treating the wastewater in at least one aerobic, and an anaerobic zone, and discharging a substantially phosphate-free wastewater stream therefrom, the improvement comprising conducting the process with the activated sludge fixed on a movable carrier material, by conveying the carrier material from the anaerobic zone to the aerobic zone, and simultaneously recycling an amount of carrier material sufficient to conduct the process continuously from the aerobic zone to the anaerobic zone to cause the organisms in the sludge to take up phosphates whereby the activated sludge therein becomes enriched with the phosphates, and separating a portion of the thus phosphate-enriched sludge from the discharged treated wastewater to result in a substantially phosphate-free effluent.

2. A process according to claim 1, wherein the separation of the portion of the activated sludge is conducted in a post clarification stage.

3. A process according to claim 2 wherein the carrier material, loaded with phosphate-containing activated sludge, is at least partially dewatered, during or after the anaerobic treatment, and subsequently the phosphate is precipitated in the discharged water from said dewatering.

4. A process according to claim 1, further comprising using a compressible carrier material as the carrier material, and comprising removing the carrier material from the treatment zones and compressing it to separate phosphate-enriched liquid and sludge therefrom.

5. A process according to claim 4 wherein the carrier material, loaded with phosphate-containing activated sludge, is at least partially dewatered, during or after the anaerobic treatment, and subsequently the phosphate is precipitated in the discharged water from said dewatering.

6. A process according to claim 1, wherein the carrier material is flushed with a liquid at least one of during and after the anaerobic treatment for separating phosphates therefrom, and the phosphates are then precipitated out of the resultant phosphate enriched liquid.

7. A process according to claim 6, wherein a partial stream of the wastewater to be purified is utilized as the liquid for conducting said flushing.

8. A process according to claim 7 wherein a portion of the thus phosphate-enriched flushing liquid is recycled to the flushing step.

9. A process according to claim 8 wherein the carrier material, loaded with phosphate-containing activated sludge, is at least partially dewatered, during or after the anaerobic treatment, and subsequently the phosphate is precipitated in the discharged water from said dewatering.

10. A process according to claim 7 wherein the carrier material, loaded with phosphate-containing activated sludge, is at least partially dewatered, during or after the anaerobic treatment, and subsequently the phosphate is precipitated in the discharged water from said dewatering.

11. A process according to claim 6 wherein a portion of the thus phosphate-enriched flushing liquid is recycled to the flushing step.

12. A process according to claim 11 wherein the carrier material, loaded with phosphate-containing activated sludge, is at least partially dewatered, during or after the anaerobic treatment, and subsequently the phosphate is precipitated in the discharged water from said dewatering.

13. A process according to claim 6 wherein the carrier material, loaded with phosphate-containing activated sludge, is at least partially dewatered, during or after the anaerobic treatment, and subsequently the phosphate is precipitated in the discharged water from said dewatering.

14. A process according to claim 1 wherein the carrier material, loaded with phosphate-containing activated sludge, is at least partially dewatered, during or after the anaerobic treatment, and subsequently the phosphate is precipitated in the discharged water from said dewatering.

15. A process as in claim 1 further comprising passing the activated sludge loaded carrier material from the aerobic zone to an anoxic zone to conduct denitrification therein.

16. In a process for the biological purification of phosphate-containing wastewater wherein the wastewater is treated, in the presence of activated sludge at least a portion of which is attached on a carrier material, the process comprising treating the wastewater in at least one aerobic, and an anaerobic zone, and discharging therefrom a substantially phosphate-free wastewater stream, the improvement comprising conducting the process with the activated sludge carried on a movable carrier material, by conveying the activated sludge loaded carrier material from the anaerobic zone to the aerobic zone, and simultaneously recycling an amount of carrier material sufficient to conduct the process continuously from the aerobic zone to cause the organisms in the activated sludge to take up phosphates whereby the activated sludge in the anaerobic zone becomes enriched with phosphates, discharging treated wastewater containing activated sludge enriched in phosphates, and separating the phosphate enriched sludge from the discharged treated wastewater.

17. A process as in claim 16 further comprising passing the activated sludge loaded carrier material from the aerobic zone to an anoxic zone to conduct denitrification therein.

* * * * *